US012715363B2

(12) United States Patent
Oosterhouse et al.

(10) Patent No.: US 12,715,363 B2
(45) Date of Patent: Aug. 25, 2026

(54) SYSTEM AND METHOD FOR VERIFYING IMAGE ORIENTATION FROM AN IMAGE SOURCE

(71) Applicant: Gentex Corporation, Zeeland, MI (US)

(72) Inventors: Andrew J. Oosterhouse, Hudsonville, MI (US); David A. Blaker, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 19/166,508

(22) PCT Filed: May 1, 2025

(86) PCT No.: PCT/IB2025/054590

§ 371 (c)(1),
(2) Date: Sep. 18, 2025

(87) PCT Pub. No.: WO2025/229598

PCT Pub. Date: Nov. 6, 2025

(65) Prior Publication Data

US 2026/0116301 A1 Apr. 30, 2026

Related U.S. Application Data

(60) Provisional application No. 63/641,480, filed on May 2, 2024.

(51) Int. Cl.
*B60R 1/26* (2022.01)
*B60K 35/22* (2024.01)
(Continued)

(52) U.S. Cl.
CPC ................ *B60R 1/26* (2022.01); *B60K 35/22* (2024.01); *B60K 35/29* (2024.01); *G06T 7/90* (2017.01);
(Continued)

(58) Field of Classification Search
CPC ....... B60R 1/26; B60R 2300/306; G06T 7/90; G06V 10/98; B60K 35/29; B60K 35/22; B60K 2360/176
See application file for complete search history.

(56) References Cited

U.S. PATENT DOCUMENTS

2018/0162276 A1 6/2018 Mokhoria
2018/0330186 A1* 11/2018 Yabuuchi .............. G06V 30/40
(Continued)

FOREIGN PATENT DOCUMENTS

| CN | 115266027 A | 11/2022 |
|---|---|---|
| EP | 4318374 A1 | 2/2024 |
| JP | H05-310078 A | 11/1993 |

*Primary Examiner* — Jae N Noh

(74) *Attorney, Agent, or Firm* — Price Heneveld LLP; Brian James Brewer

(57) ABSTRACT

A rear camera display system is provided for a vehicle. The rear camera display system includes: an image sensor configured to capture images of a rearward field of view; and a display system. The display system includes: an image processor and a display coupled to the image processor for displaying the images received from the image processor. The image processor configured to: receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images.

20 Claims, 3 Drawing Sheets

(51) Int. Cl.

| | |
|---|---|
| ***B60K 35/29*** | (2024.01) |
| ***G06T 7/90*** | (2017.01) |
| ***G06V 10/98*** | (2022.01) |

(52) U.S. Cl.

CPC ........ *G06V 10/98* (2022.01); *B60K 2360/176* (2024.01); *B60R 2300/306* (2013.01)

(56) References Cited

U.S. PATENT DOCUMENTS

| | | | | |
|---|---|---|---|---|
| 2020/0086792 | A1 | 3/2020 | Kikuchi et al. | |
| 2023/0419715 | A1* | 12/2023 | Zhang .................... | G06V 30/42 |
| 2026/0011003 | A1* | 1/2026 | Chang ................... | G06T 7/0012 |

* cited by examiner

SYSTEM AND METHOD FOR VERIFYING IMAGE ORIENTATION FROM AN IMAGE SOURCE

CROSS-REFERENCE TO RELATED APPLICATION

This application claims priority to and the benefit under 35 U.S.C. § 119(e) of U.S. Provisional Patent Application No. 63/641,480, filed on May 2, 2024, entitled "SYSTEM AND METHOD FOR VERIFYING IMAGE ORIENTATION FROM AN IMAGE SOURCE," by Andrew J. Oosterhouse et al., the entire disclosure of which is incorporated herein by reference.

TECHNICAL FIELD

The present disclosure generally relates to a vision system for a vehicle and more particularly to a rear camera display (RCD) system providing a rearward view to a display.

SUMMARY

According to one aspect of the present disclosure, a rear camera display system is provided for a vehicle. The rear camera display system includes: an image sensor configured to capture images of a rearward field of view; and a display system. The display system includes: an image processor and a display coupled to the image processor for displaying the images received from the image processor. The image processor configured to: receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images.

According to another aspect of the present disclosure, a display system is provided for a vehicle having an image sensor configured to capture images of a rearward field of view. The display system includes an image processor and a display coupled to the image processor for displaying the images received from the image processor. The image processor configured to: receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images.

According to another aspect of the present disclosure, a method is provided for processing images captured by an image sensor of a rearward field of view relative to a vehicle, the method comprising: receiving the images from the image sensor; modifying at least one corner of the images such that the orientation of the image as received from the image sensor may be determined; horizontally flipping the images; and confirming that the modified images have been horizontally flipped based on the location of the modification to the at least one corner of the modified images.

These and other features, advantages, and objects of the present disclosure will be further understood and appreciated by those skilled in the art by reference to the following specification, claims, and appended drawings.

BRIEF DESCRIPTION OF THE DRAWINGS

The present disclosure will become more fully understood from the detailed description and the accompanying drawings, wherein.

DETAILED DESCRIPTION

Figure 1:
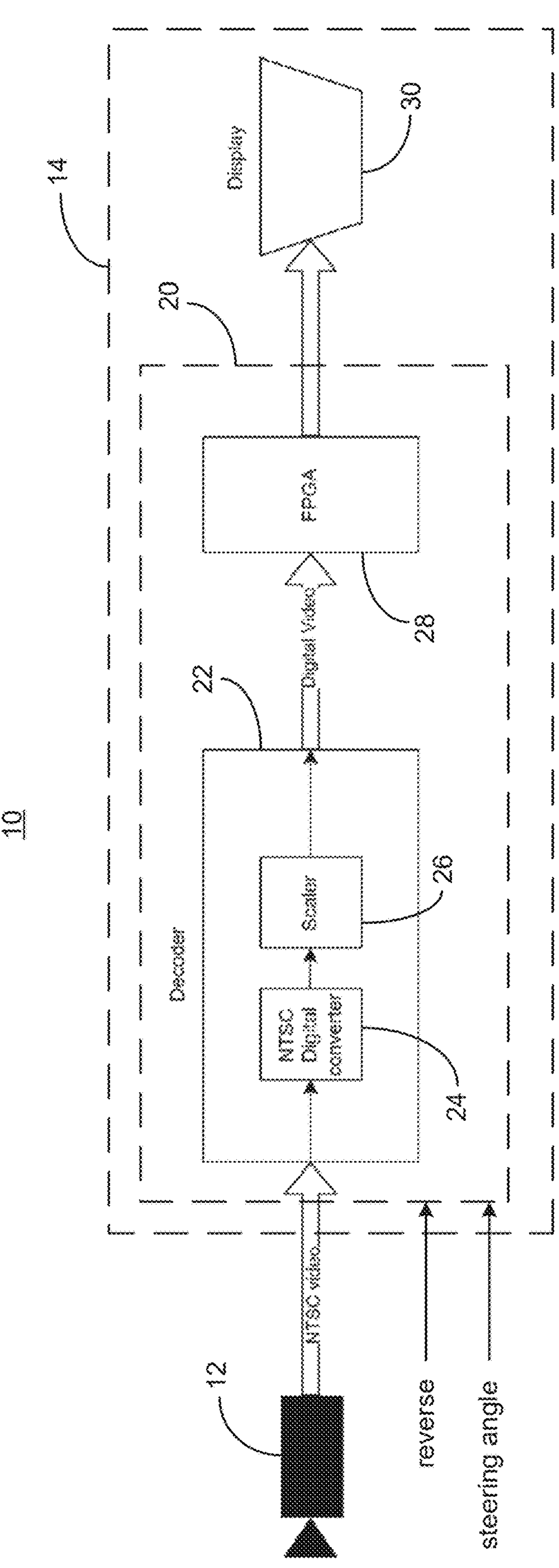
FIG. 1 is an electrical circuit diagram in block form of a rear camera display system for a vehicle.

The present illustrated embodiments reside primarily in combinations of method steps and apparatus components related to a vehicle rear camera display (RCD) system and method thereof. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Vision systems, such as RCD systems have become commonplace within vehicles. RCD systems typically include a rearward facing camera, an image processor, and a display. RCD systems cause the rearward image from the camera to be displayed whenever the vehicle is in reverse gear. Graphics may be superimposed that show the projected rearward path of the vehicle based on the steering angle of the vehicle. Because RCDs are intended to mimic a rearview mirror, and because the rearward camera is facing rearward, the image processors are configured to horizontally flip the images. However, in practice, it is possible that the image processor is not properly configured to horizontally flip the images and the driver may not readily notice that the images have not been flipped. This could result in the driver turning the car in the wrong direction to avoid an object appearing at one side of the displayed image.

Referring to FIG. 1, an RCD system 10 is shown equipped with an image sensor 12 and a display system 14. The image sensor 12 may, for example, be a National Television System Committee (NTSC) video camera configured to capture images of a rearward field of view.

The display system 12 may include an image processor 20 and a display 30 coupled to the image processor 20 for displaying the images received from the image processor 20. The image processor 20 is configured to: receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images.

The image processor 20 may include a decoder 22 for receiving and decoding the images received from the image sensor 14, modifying the at least one corner of the images such that the orientation of the image as received from the image sensor 14 may be determined, and horizontally flipping the images. The image processor 20 may further include a field programmable gate array (FPGA) 28 for receiving the modified images from the decoder 22 and for confirming that the modified images have been horizontally flipped based on the location of the modification to the at least one corner of the modified images.

The decoder 22 may include an NTSC digital converter 24 for converting NTSC video received from the image sensor 14 to digital video, and a scaler 26 for scaling the images and for modifying the at least one corner of the images. An example of one suitable decoder is the TW8819 Ultra Low Cost LCD Controller available from Renesas Electronics Corporation.

The display 30 may be positioned in a rearview mirror assembly, a front console, or in any other location viewable by the driver. The image processor 20 may be located in the same relative location as the display 30 or may be located proximate the rear image sensor 14 or in an intermediate location.

Figure 2:
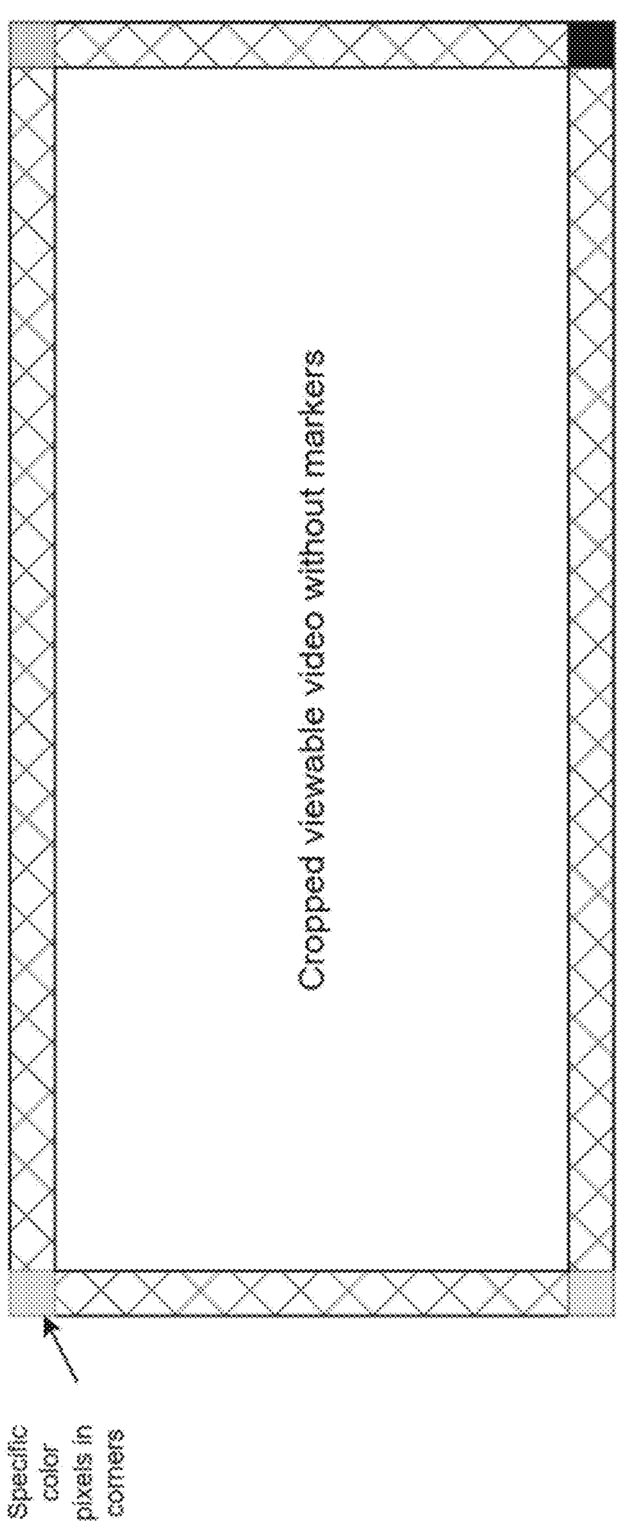
FIG. 2 is an illustration of a first example of an image as modified by the system shown in FIG. 1.

FIG. 2 shows an example of a modified image in which the image is cropped to provide some pixels around the border of the image that can be modified without being displayed on the display 30. One or more corner pixels may be modified to have particular colors. Thus, the modified image may, for example, have a first color (e.g., green) pixels in the upper left corner and/or a second color (e.g., red) pixels in the upper right corner. The FPGA 28 may then detect whether the images have been horizontally flipped by checking the color of the pixels in the corners of the images. For example, the modified image in FIG. 2 should then have green pixels in the upper right corner and red pixels in the upper left corner. The FPGA 28 could also detect if the image was incorrectly vertically flipped if those colored pixels appeared in the lower corner(s).

Figure 3:
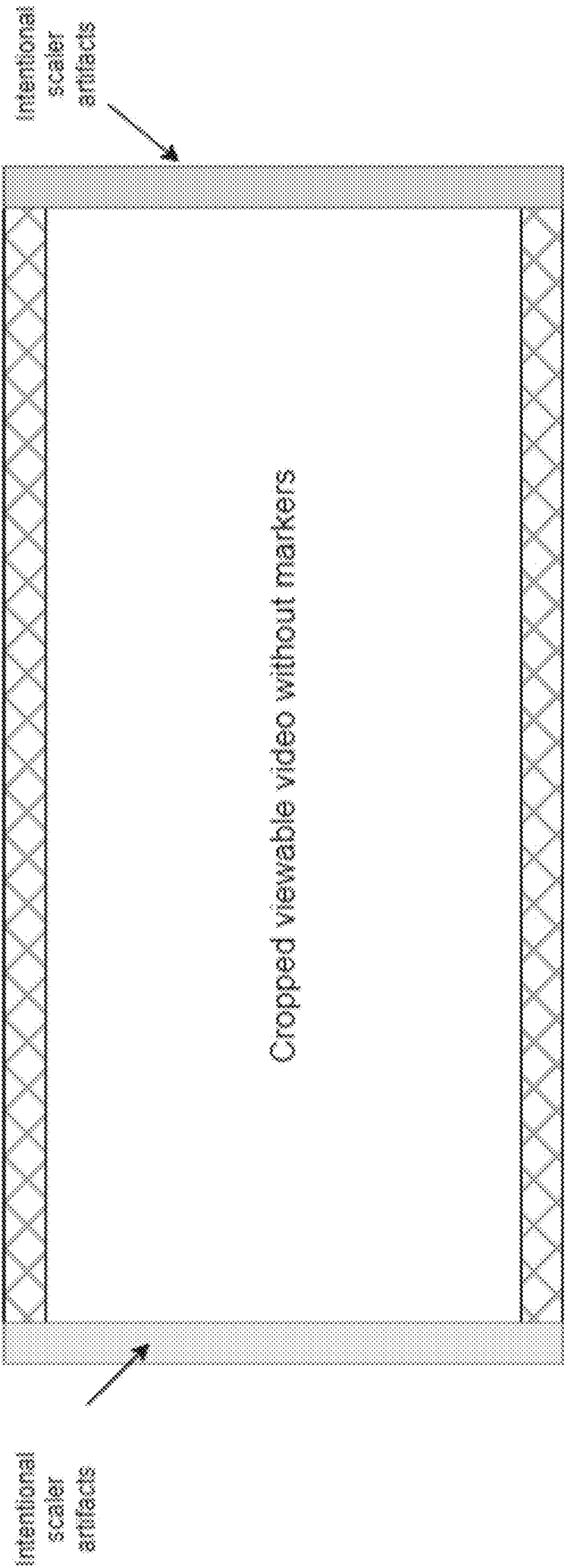
FIG. 3 is an illustration of a second example of an image as modified by the system shown in FIG. 1.

FIG. 3 shows another example of a modified image in which artifacts are intentionally introduced using the scaler 26. In this case, the scaler 26 may be intentionally misaligned to produce artifacts on either edge of the image. This would allow the FPGA 28 to detect horizontal image flip. As used herein, the "edge" of the image may include one or more of the several rows or columns of pixels proximate the edges of the image. For example, the artifacts may be produced in the first, second, or third column proximate an edge of the image or in the last column, second to last column, etc. proximate an opposite edge.

The display system 12 may be implemented on a full display mirror (FDM) platform where a second FDM camera is used having a higher rearward field of view to provide a full-time display of the rearward scene so as to replace the mirror of the rearview mirror assembly.

If the FPGA 28 detects that the images are not properly flipped, an error message may be displayed on display 30 or some other indication may be provided such that the image processor 20 may be properly configured to horizontally flip the images.

According to one of the various aspects of the present disclosure, a rear camera display system is provided for a vehicle, the rear camera display system including an image sensor configured to capture images of a rearward field of view and a display system. The display system including: an image processor configured to: receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images; and a display coupled to the image processor for displaying the images received from the image processor.

According to another one of the various aspects of the present disclosure, a display system is provided for a vehicle having an image sensor configured to capture images of a rearward field of view. The display system including: an image processor configured to: receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images; and a display coupled to the image processor for displaying the images received from the image processor.

According to another one of the various aspects of the present disclosure, a method is provided for processing images captured by an image sensor of a rearward field of view relative to a vehicle, the method comprising: receiving the images from the image sensor; modifying at least one corner of the images such that the orientation of the image as received from the image sensor may be determined; horizontally flipping the images; and confirming that the modified images have been horizontally flipped based on the location of the modification to the at least one corner of the modified images.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

What is claimed is:

1. A rear camera display system for a vehicle, the rear camera display system comprising:

an image sensor configured to capture images of a rearward field of view; and a display system comprising:

an image processor configured to:

receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images; and a display coupled to the image processor for displaying the images received from the image processor.

2. The rear camera display system of claim 1, wherein the image processor comprises:

a decoder for receiving and decoding the images received from the image sensor, modifying the at least one corner of the images such that the orientation of the image as received from the image sensor may be determined, and horizontally flipping the images; and a field programmable gate array for receiving the modified images from the decoder and for confirming that the modified images have been horizontally flipped based on the location of the modification to the at least one corner of the modified images.

3. The rear camera display system of claim 2, wherein the decoder comprises an NTSC digital converter for converting NTSC video received from the image sensor to digital video, and a scaler for scaling the images and for modifying the at least one corner of the images.

4. The rear camera display system of claim 1, wherein the image processor crops the images from the image sensor and modifies the at least one corner of the images to have a particular color.

5. The rear camera display system of claim 4, wherein the image processor modifies the images to have a first color in an upper left corner and a second color in an upper right corner.

6. The rear camera display system of claim 5, wherein the image processor confirms that the modified images have been horizontally flipped by checking the colors of the upper corners such that the first color is in the upper right corner and the second color is in the upper left corner.

7. The rear camera display system of claim 1, wherein the image processor introduces artifacts on either edge of the images from the image sensor.

8. The rear camera display system of claim 7, wherein the image processor confirms that the modified images have been horizontally flipped by detecting the location of artifacts in the images.

9. The rear camera display system of claim 1, wherein the image processor causes an error message to be displayed on the display when the image processor detects that the images are not properly flipped.

10. A display system for a vehicle having an image sensor configured to capture images of a rearward field of view, the display system comprising:

an image processor configured to:

receive the images from the image sensor, modify at least one corner of the images such that the orientation of the image as received from the image sensor may be determined, horizontally flip the images, and confirm that the modified images have been horizontally flipped based on the location of the modification to the at least one corner of the modified images; and a display coupled to the image processor for displaying the images received from the image processor.

11. The display system of claim 10, wherein the image processor comprises:

a decoder for receiving and decoding the images received from the image sensor, modifying the at least one corner of the images such that the orientation of the image as received from the image sensor may be determined, and horizontally flipping the images; and a field programmable gate array for receiving the modified images from the decoder and for confirming that the modified images have been horizontally flipped based on the location of the modification to the at least one corner of the modified images.

12. The display system of claim 11, wherein the decoder comprises an NTSC digital converter for converting NTSC video received from the image sensor to digital video, and a scaler for scaling the images and for modifying the at least one corner of the images.

13. The display system of claim 10, wherein the image processor crops the images from the image sensor and modifies the at least one corner of the images to have a particular color.

14. The display system of claim 13, wherein the image processor modifies the images to have a first color in an upper left corner and a second color in an upper right corner, and wherein the image processor confirms that the modified images have been horizontally flipped by checking the colors of the upper corners such that the first color is in the upper right corner and the second color is in the upper left corner.

15. The display system of claim 10, wherein the image processor introduces artifacts on either edge of the images from the image sensor and confirms that the modified images have been horizontally flipped by detecting the location of artifacts in the images.

16. The display system of claim 10, wherein the image processor causes an error message to be displayed on the display when the image processor detects that the images are not properly flipped.

17. A method of processing images captured by an image sensor of a rearward field of view relative to a vehicle, the method comprising:

receiving the images from the image sensor;

modifying at least one corner of the images such that the orientation of the image as received from the image sensor may be determined;

horizontally flipping the images; and confirming that the modified images have been horizontally flipped based on the location of the modification to the at least one corner of the modified images.

18. The method of claim 17, wherein the step of modifying at least one corner of the images includes cropping the images from the image sensor and modifying the at least one corner of the images to have a particular color, and wherein the step of confirming that the modified images have been horizontally flipped includes determining that the corner having the particular color is located on an opposite side of the images.

19. The method of claim 17, wherein the step of modifying at least one corner of the images includes introducing artifacts on either edge of the images from the image sensor, and wherein the step of confirming that the modified images have been horizontally flipped includes detecting the location of artifacts in the images.

20. The method of claim 17 and further comprising causing an error message to be displayed on a display when the images are not properly flipped.

* * * * *